United States Patent Office 3,159,681
Patented Dec. 1, 1964

3,159,681
PREPARATION OF LIQUID REACTION PRODUCTS OF DIBORANE AND ACETYLENE
Hugo Stange, Niagara Falls, Earl A. Weilmuenster, Kenmore, and Joel A. Zaslowsky, Niagara Falls, N.Y., assignors, by mesne assignments, to Olin Mathieson Chemical Corporation, a corporation of Virginia
No Drawing. Filed June 8, 1955, Ser. No. 514,122
2 Claims. (Cl. 260—606.5)

Our invention relates to a process for the manufacture of liquid products which are useful as fuels by reacting acetylene and diborane.

Only a very limited amount of work has been published prior to our invention concerning the reaction of acetylene and diborane. Stock (Stock, A. E., Hydrides of Boron and Silicon, Cornell University Press, Ithaca, N.Y., 1933, p. 150) was able to cause the two materials to react by warming them to 50° C. However, the resulting products were solids. Stock found that by heating the acetylene and diborane to 100° C. or by subjecting the gases to quick compression explosive action took place with the formation of brown solids.

In accordance with our present invention, we have devised a process whereby acetylene and diborane can be reacted to provide products which are liquid. These products represent conveniently-handled fuels, and certain of them possess particular advantage in view of their very high heat of combustion. This is accomplished, in accordance with our present invention, by reacting the acetylene and diborane, while diluted with an inert gas, in the vapor phase at a temperature within the range 100° C. to 250° C.

The following examples illustrate various embodiments falling within the scope of our invention and are to be considered as not limitative.

EXAMPLE I

The apparatus employed in performing this example was essentially a down flow jacketed reaction tube about twenty inches long made of glass, provided with an inlet line for the introduction of diborane, with sparger tube for the introduction of acetylene, with jacket provided with inlet line and outlet line for the introduction and removal of heat transfer medium (hot oil), and with thermowell for measuring reaction temperature.

Diborane was diluted with 3.75 parts by volume of hydrogen which had been passed through a deoxidizing chamber to remove any oxygen and through a drying chamber in order to remove any traces of moisture. The mixture of diborane and hydrogen, in gaseous form, was passed into the inlet line of the apparatus. Acetylene for the experiment, after having been passed through suitable scrubbing towers to remove any traces of water and acetone, was diluted with 7.5 parts by volume of hydrogen, and the gaseous mixture was conducted into the reaction zone through the long perforated sparger tube. The molecular ratio of diborane to acetylene was maintained at 2 to 1. At 140° C. the reaction occurred upon contact of the gas stream containing the diborane with the gas stream containing the acetylene. A white cloud was formed which was carried through the reactor by the diluent hydrogen. The reaction products, which were chiefly liquids of low vapor pressure, were separated from the gas stream by condensation in cold traps. During a 77 minute run, 12.8 grams of liquid product, which consisted of 2 grams of a volatile portion and 10.8 grams of crude material, was produced. The molecular weight of the volatile portion was measured and found to be 53.6, which is identical with that of the 1 to 1 adduct of diborane and acetylene. In this experiment, the conversion of diborane was 56 percent and the conversion of acetylene was 100 percent.

This procedure produces a liquid product containing 35 percent by weight of boron.

EXAMPLE II

The apparatus employed in this example was the same as that used in Example I and the reaction was carried out similarly.

Thus, diborane was diluted with 2.16 parts by volume of hydrogen which had been treated as described in the preceding example to remove oxygen and traces of moisture and the gaseous mixture was passed into the reaction tube, which was maintained at a temperature of about 134° C. Acetylene which had been dried was diluted with 8.5 parts by volume of hydrogen and the gaseous mixture then conducted into the heated reaction zone through the perforated tube. The molecular ratio of diborane to acetylene was maintained at 3 to 1. The reaction proceeded in the same manner as in Example I in that it occurred instantaneously upon contact of the two gas streams. The product of the reaction was condensed and recovered in cold traps; during the three hour run, 18.6 grams of liquid product was made.

This procedure produces a liquid product containing 40 percent by weight of boron.

EXAMPLE III

A number of experiments have been completed using two sparger-type reactors operating in series. In this system two, tubular, down-flow reactors were operated in series with acetylene introduced into both reactors through ¼ inch stainless steel sparger tubes. The primary (first) reactor was a jacketed Pyrex tube approximately 12 inches in length with a 42 mm. inside diameter. The sparger was drilled with 20 holes of 0.0145 inch diameter spaced ½ inch apart and it extended into the reactor about ½ of the reactor length. The secondary (second) reactor was similar to the first but was 24 inches in length. The sparger for this reactor was drilled with 20 holes of 0.0145 inch diameter spaced one inch apart and it extended into the reactor about two-thirds of its length.

High purity research grade acetylene, which had been dried by passage through a column of absorbent for removal of water, was used in this experiment. The diborane utilized was not subjected to any type of pretreatment. Hydrogen, was passed through a deoxo unit and drying tower filled with absorbent to remove traces of oxygen and moisture before being introduced into the reactor. Four rotameters were used to measure the gases sent to the first reactor. Two of these were used to measure the gases entering the annular space, one for hydrogen and one for acetylene. The remaining two rotameters were used to measure the gases entering the sparger tube, one for hydrogen and one for diborane. Gases entering the sparger were mixed outside the reactor and entered the sparger through a single inlet; the same was true for the gases entering the annular space. The temperature of each reactor was measured by means of a thermocouple located near the exit end of the heated zone of the reactor. In this experiment diborane at the rate of 900 cc. per minute at S.T.P. and hydrogen at the rate of 4500 cc. per minute at S.T.P. were metered through separate rotameters, mixed together and passed into the annular space of the first reactor through a common inlet tube. Acetylene, at the rate of 300 cc. per minute at S.T.P., and hydrogen, at the rate of 1500 cc. per minute at S.T.P., were metered through rotameters, mixed together and passed into the sparger tube of the first reactor through a common inlet. The temperature of the first reactor at the start of the reaction was 155° C.; this temperature was attained by circulating hot oil through the jacket of the reactor. During the course of the exothermic reaction the temperature of the first reactor, as measured by the thermocouple, varied from 155° C. to 175° C. The reaction stream of the first reactor was discharged into a spiral tube trap cooled to −78° C. with a Dry Ice-trichloroethylene mixture. The non-condensible gases leaving the first cold trap were then let into the annular space of the secondary reactor. An additional amount of acetylene (200 cc. per minute at S.T.P.) and hydrogen (1500 cc. per minute at S.T.P.) were introduced into the secondary reactor through the stainless steel sparger tube. The temperature of the secondary reactor was maintained at 165° C. by the circulation of hot oil through the jacket of the reactor. The reaction products of the second reactor were then led through two spiral cold traps, the first held at −78° C. and the second held at −130° C. Non-condensible gases leaving the final trap were vented through a bubble-off filled with silicone fluid. The reaction was allowed to proceed for one hour. The traps were then allowed to warm slowly to room temperature and were vented into a slow stream of nitrogen which discharged into a hood. After being degassed overnight at room temperature the product remaining in each individual trap was weighed and the weight recorded as "stable liquid product." During the reaction 12 g. of stable liquid product was recovered from the first trap (the trap located just downstream from the primary reactor) and a total of 17.4 g. of stable liquid product was obtained from both traps which followed the second reactor. The stable liquid product from the trap following the primary reactor was analyzed and found to contain 40.3 percent boron; the stable liquid products from the two final traps were bulked, analyzed, and found to contain 36.1 percent boron.

Data concerning Examples IV and V, which are similar to Example III, are set forth in Table I.

gas to the extent of from about 5 to about 85 percent by volume, based upon the volume of the total inlet gas stream to the reaction zone.

Diluent gases other than hydrogen can also be employed in accordance with our invention, for example, nitrogen or mixtures of nitrogen and hydrogen. Various procedures can be employed in introducing the diluent gas to the reaction zone. In introducing the diluent gas into the reaction zone, the entire amount of such gas introduced can be introduced in admixture with the diborane or with the acetylene, or a part can be introduced with the diborane and the remainder with the acetylene as in the specific examples, or the diluent gas can be introduced as an independent stream with efficient mixing of the diborane, acetylene and diluent gas at the time the diborane and acetylene contact each other. For best operation, it is important that no oxygen or water enter the reaction system, since these materials react, and under certain conditions, react violently with diborane to form solid boric acid.

In accordance with our process, the reaction is performed at a temperature within the range from 100° C. to 250° C. Temperatures at the higher end of the range favor the formation of solid reaction products, rather than the desired liquid ones. To bring the reactants from room temperature to a temperature approximately 100° C. in order to initiate the reaction, the reaction zone can be heated by some appropriate method, such as the circulation of hot oil through a jacket surrounding the reaction zone, as the specific examples illustrate. The reaction is exothermic, and when once initiated cooling rather than heating may be required, depending upon the efficiency of heat dissipation from the reaction zone.

The liquid product formed when our process is carried out has a low vapor pressure and therefore can be separated from the reaction zone effluent by cooling, by extrac-

*Table I*

| Gas Ratios to Primary Reactor | Example III | | Example IV | | Example V | |
|---|---|---|---|---|---|---|
| $B_2H_6$, cc. per min | 900 | | 900 | | 900 | |
| $H_2$, cc. per min | 4,500 | | 1,500 | | 500 | |
| $C_2H_2$, cc. per min | 300 | | 300 | | 300 | |
| $H_2$, cc. per min | 1,500 | | 4,500 | | 5,500 | |
| $B_2H_6$ used, gms. per hr | 78 | | 70.7 | | 73.3 | |
| Gms. $B_2H_6$ used per gm. liquid product | 2.7 | | 1.7 | | 2.0 | |
| | Primary | Secondary | Primary | Secondary | Primary | Secondary |
| React. Zone Temp., °C | 155–175 | 165 | 160–175 | 145 | 160 | 135 |
| Stable Liquid Product, gms | 12 | 13 | 26 | 30 | 17 | 8 |
| Stable Liquid Product, gms. per hr | 12 | 17.4 | 17.4 | 24 | 22.7 | 13.8 |
| Solids, gms | 7 | 1 | 4 | None | 3 | None |
| Solids, gms. per hr | 7 | 1.2 | 2.4 | None | 4 | None |
| Boron in Product, percent | 40.3 | 36.1 | 40.4 | 36.2 | 41.1 | 34.6 |
| Reaction time | 1 hour | | 1 hr. 40 min. | | 45 min. | |

Gas flows to secondary reactor for all experiments were 1,500 cc. per min. of hydrogen and 200 cc. per min. of acetylene.

Various modifications can be made in the procedures of the specific examples to provide other embodiments which fall within the scope of our invention. Thus, the relative amounts of diborane and acetylene can be varied widely, limited only by the practicality of operation. In the case of high acetylene to diborane ratios (over 1 to 1), however, the liquid products produced are not as high in heat of combustion as those produced when using mixtures relatively rich in diborane. Moreover, the amount of diluent gas introduced into the reaction zone can be varied widely, the amount so introduced in practice depending upon the efficient mixing and heat transfer necessary for any particular mode of operation. The volume ratio of acetylene to diborane can be varied widely, generally being from about one part by volume of acetylene to 20 parts by volume of diborane to about one part by volume of acetylene to 1.5 parts by volume of diborane. Also, in general, the reaction stream will contain diluent (inert)

tion with a suitable solvent such as fraction of the liquid product itself, or by other conventional means. Small amounts of solids which may be formed during periods of start-up or shut-down can be separated from the reaction mixture using gas-solid separation means, such as a centrifugal filter or a cyclone separator. The primary reaction product has the appearance of a light yellow oil. When this oil is pumped free of volatile materials, there can be recovered a volatile liquid having a molecular weight of 53.5, which is in agreement with a 1 to 1 addition compound of diborane and acetylene. Upon hydrolysis, 4 moles of hydrogen are released from this compound. The relative amount of the compound produced depends upon the reaction conditions.

The residue remaining after the oil has been pumped free of volatile materials is a non-volatile oil which is stable at room temperatures in bulk form but which is pyrogenic when a large surface is exposed, such as the absorption of the liquid on a cloth rag. We have not as yet determined the molecular structure of this material, and it may be in the form of a polymer or condensed ring structure. The molecular composition of this product can be varied by varying the molecular ratios of the reactants charged to the reaction zone. Analytical data indicate that the carbon to boron ratio can vary from 0.5 to 2.0 and that the compositions can have heats of combustion as high as about 23,000 to 25,000 B.t.u. per pound.

One form of operating procedure of our process is illustrated by the following. Acetylene from a storage vessel is dried, diluted with hydrogen, and the mixture then passed into a down-flow reactor. The hydrogen used as a diluent for the acetylene is first passed through an oxidizer for removal of any oxygen, and is then dried. Diborane from a suitable refrigerated storage vessel, together with recycled hydrogen and diborane, is simultaneously charged to the reactor. The temperature of the reaction zone is maintained between 130° C. and 190° C. by circulation of a stream of oil through the reactor jacket and then through a heat exchanger. Actual introduction of the acetylene and accompanying hydrogen is accomplished through a long perforated tube which extends approximately the entire distance of the heated reaction zone. The use of such a perforated tube for the purpose of introducing the acetylene into the diborane is of considerable importance in practice, as it enables one to conduct the reaction more rapidly under controllable conditions.

The reaction occurs instantaneously in the range of temperatures mentioned, and the products and unreacted gases are then conducted to a low temperature condenser whereby the diborane-acetylene product is removed. Diluent together with unreacted gases passing through the condenser is sent to a compressor and recycled to the reaction system. The recycled gases re-enter the reaction zone after being combined with the fresh diborane feed. Product from the low temperature condenser is sent to a centrifugal filter which removes any small quantities of solid products that may have been formed during the reaction.

The compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the asoblute pressure of the air before compression. Therefore, the operating combustion pressure in the combustor can vary from approximately 90 to 300 pounds per square inch absolute at static sea level conditions to about 5 to 15 pounds per square inch absolute, at the extremely high altiudtes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the 1:1 adduct of diborane and acetylene, for example, this local fuel to air ratio by weight is approximately 0.071. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of our invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and the hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of our invention are such that good combustion performance can be attained even at the marginal operating conditions encountered at high altitude, insuring efficient and stable combustion and improvement in the zone of operation before lean and rich extinction of the combustion process is encountered. Significant improvements in the non-after-burning performance of a gas turbine-afterburner combination is also possible because the high chemical reactivity of the products of our invention eliminates the need of flameholding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention will improve the combustion process of the ramjet in much the same manner as that described for the afterburner because of their improved chemical reactivity over that of simple hydrocarbon fuels. When employed in a ramjet the fuels of our invention will be simply substituted for hydrocarbon fuels and used in the established manner.

This application is a continuation-in-part of our copending application Serial No. 411,336, filed February 19, 1954, and now abandoned.

We claim:

1. A method of preparing a liquid high energy fuel which comprises reacting diborane and acetylene in the vapor phase at a temperature in excess of 100° C., at atmospheric pressure and in the presence of an inert gas diluent.

2. A method for the production of a liquid reaction product of acetylene and diborane which comprises reacting acetylene and diborane in vapor phase in admixture with an inert gas in a reaction zone at a temperature of 100° C. to 250° C.

No references cited.

TOBIAS E. LEVOW, *Primary Examiner.*
WILLIAM G. WILES, *Examiner.*